(12) United States Patent
Erhart et al.

(10) Patent No.: US 6,243,678 B1
(45) Date of Patent: Jun. 5, 2001

(54) METHOD AND SYSTEM FOR DYNAMIC SPEECH RECOGNITION USING FREE-PHONE SCORING

(75) Inventors: George W. Erhart, Pataskala; Ronald L. Hartung, Columbus, both of OH (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/056,346

(22) Filed: Apr. 7, 1998

(51) Int. Cl.[7] ................................................. G10L 15/00
(52) U.S. Cl. ............................................................ 704/249
(58) Field of Search ................................... 704/231, 249, 704/251, 254, 255

(56) References Cited

U.S. PATENT DOCUMENTS

| | | | |
|---|---|---|---|
| 4,227,177 | * 10/1980 | Moshier | 704/231 |
| 4,241,329 | * 12/1980 | Bahler et al. | 704/231 |
| 4,481,593 | * 11/1984 | Bahler | 704/231 |
| 4,489,434 | * 12/1984 | Moshier | 704/251 |
| 4,489,435 | * 12/1984 | Moshier | 704/251 |
| 4,837,831 | * 6/1989 | Gillick et al. | 381/43 |
| 5,202,952 | * 4/1993 | Gillick et al. | 704/200 |
| 5,526,463 | * 6/1996 | Gillick et al. | 704/251 |
| 5,719,997 | * 2/1998 | Brown et al. | 704/257 |
| 5,822,730 | * 10/1998 | Roth et al. | 704/255 |
| 5,850,627 | * 12/1998 | Gould et al. | 704/231 |
| 5,909,666 | * 6/1999 | Gould et al. | 704/251 |
| 5,913,192 | * 6/1999 | Parthasarathy et al. | 704/256 |

* cited by examiner

*Primary Examiner*—Krista Zele
*Assistant Examiner*—Michael N. Opsasnick

(57) ABSTRACT

A system performing a speech recognition process requests and receives a claim of identity. The system accesses a customer database and generates a subword spelling of a stored text string where the text string includes predetermined information. The system accesses a subword model database to construct a subword model comprising a series of phonemes. The system requests and receives a speech utterance. A free-phone model of the speech utterance is generated independently of the information stored in the customer database. The system generates a free-phone score. The system generates a word score. The system determines whether the speech utterance matches the stored text string based on the free-phone score and the word score.

10 Claims, 3 Drawing Sheets

METHOD AND SYSTEM FOR DYNAMIC SPEECH RECOGNITION USING FREE-PHONE SCORING

BACKGROUND OF THE INVENTION

1. Field of the Invention

The invention relates generally to a method and apparatus for speech recognition and, more particularly, to a method and system for dynamic speech recognition using free-phone scoring.

2. Description of the Related Art

Remote telephone access by a customer to confidential bank or credit card account information has become common. Typically, the customer enters an account number followed by a Personal Identification Number (PIN) via the telephone keypad. The application automatically accesses the specified account information and compares the entered PIN with that stored in the account. If there is a match between PINs, then the application allows the customer to proceed to access the account information. On the other hand, if the PINs do not match, then the application usually calls for human intervention, such as forwarding the call to an account representative. Often the PINs do not match because the customer has forgotten the PIN, and, therefore, the account representative must request a "secret password," such as the maiden name of the customer's mother, to identify the customer as having authorization to access the account. Such human intervention is costly, requiring a team of representatives waiting to intervene.

Typical speech recognition systems are unsuitable for replacing such human intervention. Speech recognition systems usually include a database storing voice templates or models, which represent complete words or phrases. The system compares these templates or models, which are constructed from collected data samples, to the received spoken words. Consequently, the database must comprise all possible responses and, therefore, requires the collection and verification of a large number of data samples. Where the recognition system is employed in an application in which customer responses are limited, such a system may be acceptable. Where the recognition system is employed in an application in which customer responses are virtually unlimited, such a system is unacceptable. Thus, a need exists for an improved voice recognition system that does not require the collection and verification of a large number of data samples.

Improvements have been made in the field of speech recognition systems. For example, U.S. Pat. No. 5,329,608 to Bocchieri et al. (Bocchieri) is directed to an improved speech recognition system. In general, Bocchieri addresses the problem of requiring data collection and verification to create word templates by allowing a customer to enter anticipated responses into a computer. Once the customer enters anticipated responses via a keyboard, the computer creates a phonetic transcription of each entered word. Creating the phonetic transcription involves accessing a dictionary database, which contains common words and associated phonetic transcriptions, and determining whether the entered word and its associated phonetic transcription already exist. If the phonetic transcription does not exist, the computer proceeds to store the entered word with its associated phonetic transcription in a vocabulary lexicon database.

Upon receiving a spoken word input, the computer constructs a subword model of the word comprising one or more sequences of subwords. Each subword comprises a series of phonemes. Each phoneme, in turn, represents a discrete sound.

The computer compares the subword model to the phonetic transcriptions in the vocabulary lexicon database to determine whether the spoken input "matches" the entered anticipated response corresponding to the phonetic transcription. The system deems that a match has occurred by assigning a confidence recognition factor to the comparison of the subword model and the phonetic transcription and determining whether that confidence factor exceeds a predetermined confidence threshold value. However, the system cannot recognize spoken data if that data has not been previously entered. Thus, while Bocchieri allows easy customization of the system, the customer of the system must still have prior knowledge of all potentially received spoken data so that it can be entered via the keyboard into the system.

Additionally, speech recognition systems must be reliable. Traditionally, the accuracy of speech recognition systems has been ensured by setting a high confidence threshold when comparing the subword model with the phonetic transcription. Such a high confidence threshold ensures that no erroneous access is allowed; however, often the high threshold causes the system to erroneously find no match and deny access to an authorized customer. Individualistic speech patterns and pronunciations and coarticulation error, which often results in the blending of phonemes, are some of the factors that contribute to these erroneous denials of access. These same factors contribute to erroneous allowance of access.

Some speech recognition systems ensure reliability by taking advantage of these individualistic speech patterns and pronunciations. More specifically, these systems utilize voice transcriptions to create a trained subword model database. This trained subword model database comprises customer-dependent phonemes. While improving reliability, the systems are expensive in set-up and operation.

Specifically, providing trained subword model databases requires pre-enrollment. Typically, training requires the customer to recite a few sentences containing words that comprise most, if not all, phonemes. The sentences are broken up into the phonemes for use in the customer-dependent subword database. Because the system involves training most or all phonemes, the system has the advantage that the secret password can be changed without retraining the system. The system, however, has the disadvantage of being costly to set up and operate. The added expense lies not only in the creation of each trained subword database, but also in the creation of the entire speech recognition system because a separate customer-dependent model must be created for each customer.

Another type of speech recognition system that utilizes a trained subword model involves training only the secret password and the particular phonemes contained therein. This type of system is less costly to implement because a trained subword database containing all phonemes is not necessary. Instead, pre-enrollment involves training only the secret password. Because only the particular secret password is trained, however, any change to the password requires re-enrollment and re-training of the new password. Again, the system is costly to set up and operate. Thus, although systems using trained subword databases are reliable, they are somewhat impractical; the need for an improved voice recognition system, particularly one that does not require prior enrollment, remains unsatisfied.

3. Summary of the Invention

These needs are satisfied by a method for recognizing a speech utterance as a predetermined unit of speech. The method comprises generating a free-phone model of the speech utterance and calculating a free-phone score representing the likelihood that the free-phone model accurately represents the speech utterance. The method also comprises determining whether the speech utterance matches the predetermined unit of speech based upon its score. In an alternative embodiment, the determination of whether the speech utterance matches the predetermined unit of speech is based upon both a word score and the free-phone score. A system for recognizing a speech utterance as a predetermined unit of speech is also provided.

DETAILED DESCRIPTION OF THE PREFERRED EMBODIMENTS

Although the preferred embodiments discussed below are in the context of governing remote access to account information, it will be apparent to one skilled in the art that the speech recognition system of the present invention is equally applicable to other applications. Certain preferred embodiments of the present invention will now be discussed with reference to the drawings.

Figure 1:
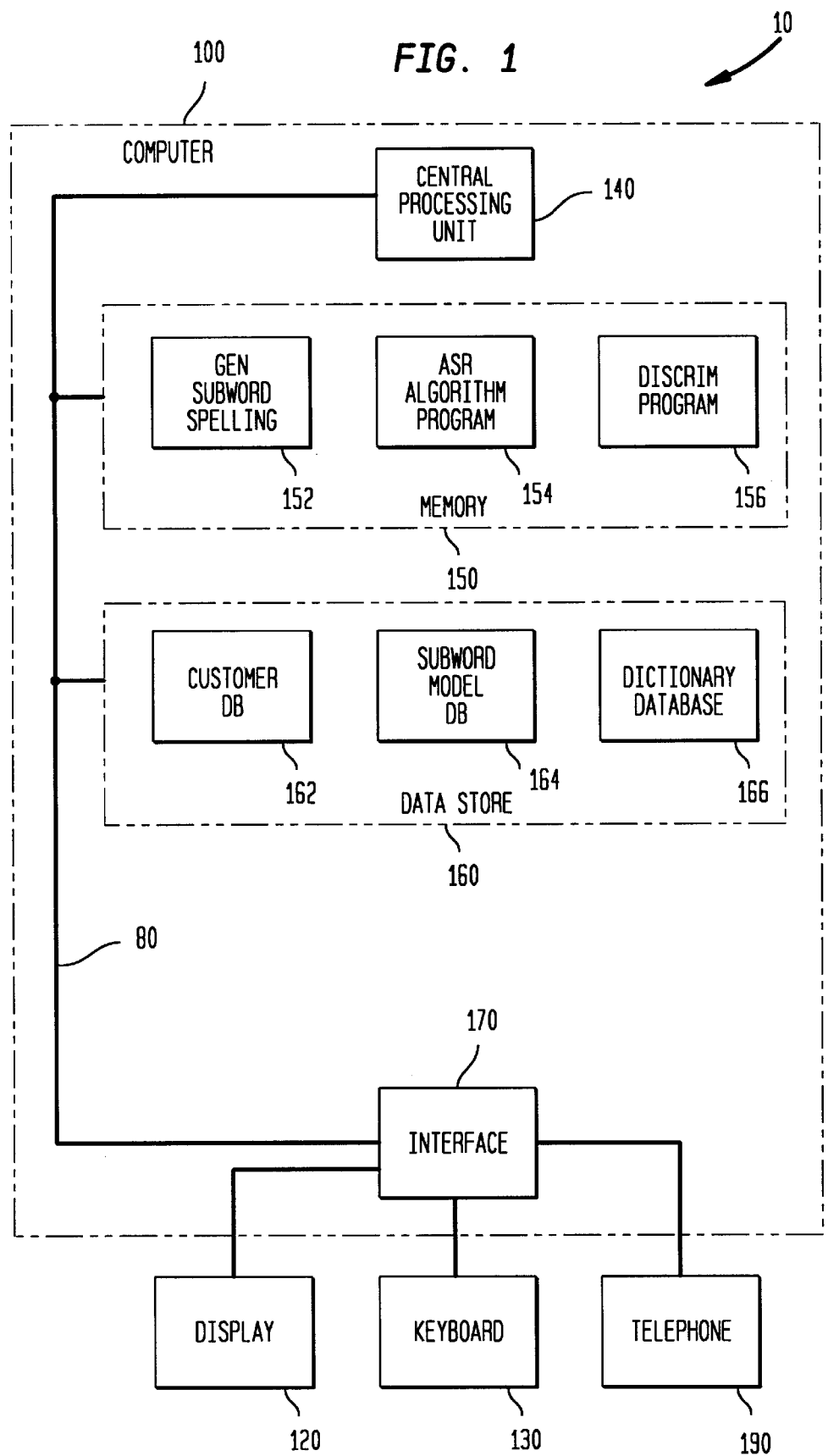
FIG. 1 is an overall schematic view of a speech recognition system according to one embodiment of the present invention.

With reference to FIG. 1, the physical components of a speech recognition system 1 according to one embodiment the present invention will now be described. Generally, the speech recognition system 1 comprises a computer 10 having a display 20 and a keyboard 30. More specifically, the computer 10 includes a central processing unit (CPU) 40, a memory 50, a data store 60, and a interface unit 70. The CPU 40, memory 50, datastore 60, and interface unit 70 are connected by data, access, and control lines 80.

Several programs for controlling the operation of the CPU 40 are stored in memory 50. The memory 50 includes a generate subword spelling program 52, an automatic speech recognition (ASR) algorithm program 54, a discriminating program 56, and a generate free-phone model program 58. Although these programs are shown and described herein as discrete programs, it is to be understood that such programs need not be so divided. Accordingly, in an alternate embodiment, the functionality of these programs is provided by a single program. Similarly, in another alternate embodiment the functionality of these programs is provided by more than four programs. In general, these programs control the CPU 40 which, in turn, accesses the datastore 60 to receive and store information.

The datastore 60 comprises two databases that the CPU 40 accesses. First, the datastore 60 includes a customer database 62. The customer database 62 includes multiple records, each record containing information pertaining to a particular customer. For example, when the speech recognition system 1 of the present invention is employed to govern access to bank account information, the customer database 62 includes fields containing the customer's account number, customer identifying information, such as a PIN and the maiden name of the customer's mother, and account information, such as available balance. Other information may include amount due, data of last payment, and payment due date.

Second, the datastore 60 includes a subword model database 64. The subword model database 64 stores all possible phonemes. Each phoneme represents a single sound. For example, in the English language, phonemes include "ah" as in "cot," "ay" as in "hay," "oo" as in "tool," "oh" as in "old," "ch" as in "check," and "k" as in "cow." As discussed below, the generate subword spelling program 52 and the generate free-phone spelling program 58 access the subword model database 64 and use these phonemes to create subword spellings of words.

Lastly, the computer 10 includes an interface unit 70. The interface unit 70 allows a bank account representative to enter information via the keyboard 30 for storage in the customer database 62. Similarly, the interface unit 70 allows the CPU 40 to display information on the computer display 20. Additionally, the interface unit 70 provides a means through which an external telephone 90 may communicate with the computer 10. The telephone 90 is typically operated by a customer calling in from a remote location to access account information stored in the customer database 62.

In an alternate embodiment, the ASR algorithm program 54 is provided is coupled to a second, dedicated CPU. The dedicated CPU, in turn, is coupled to the data, access, and control lines 80 so that the dedicated CPU may receive input and send output to the other components of the system 1.

In general, as discussed in greater detail below, when a customer accesses the system 1 via the telephone 90, the system 1 requests a particular speech utterance from the customer. The speech utterance requested matches particular identifying information stored in the customer database 62. For example, the system 1 may request the customer to speak maiden name of the customer's mother, which is stored in the customer database associated with that particular customer. The system 1 proceeds to manipulate both the stored data in the customer database 62 and a speech utterance received from a customer in order to determine whether the speech utterance matches the stored information in the customer database 62.

Figure 2:
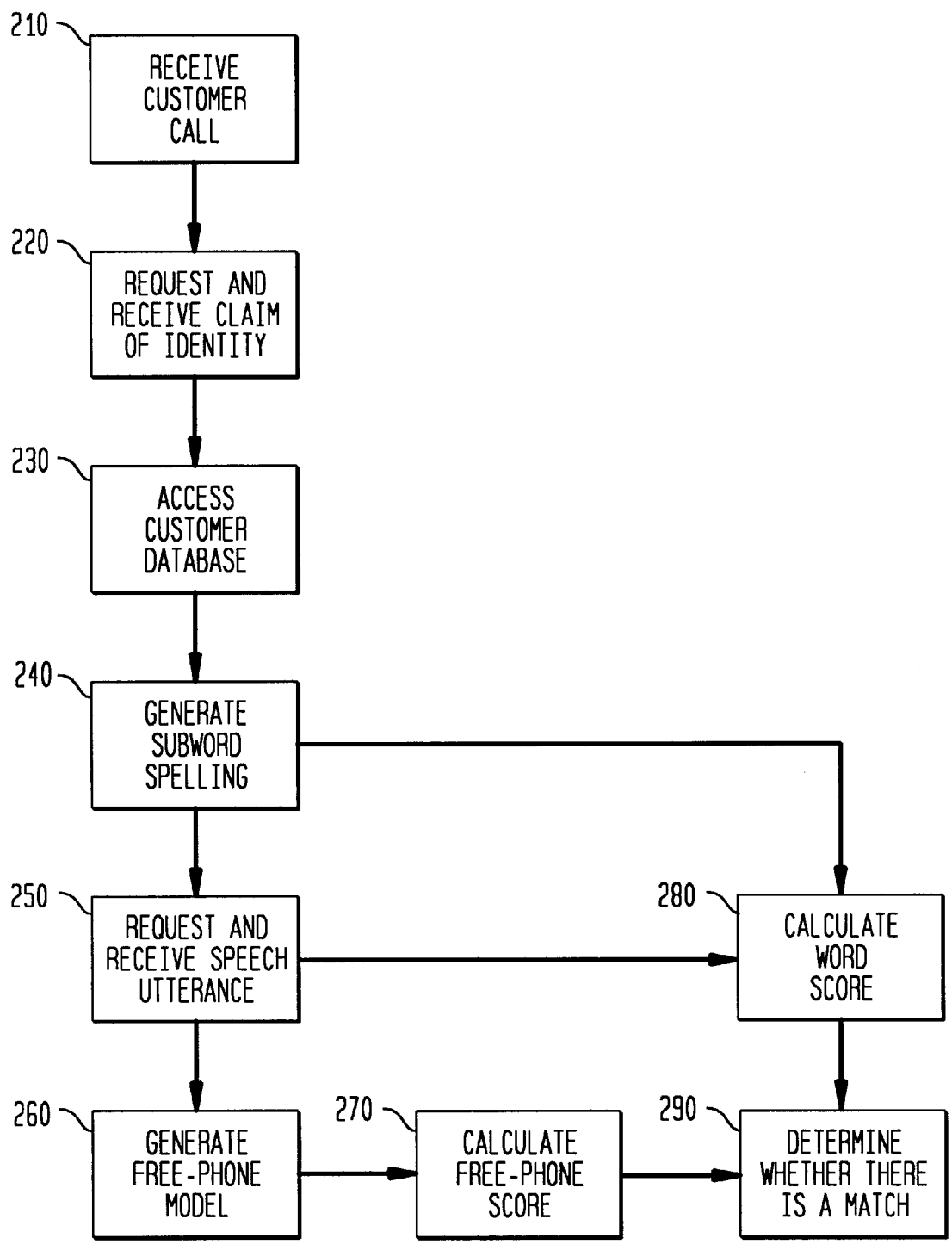
FIG. 2 is an overall flow diagram of the operation of the speech recognition system of FIG. 1.

The operation of a system 1 will now be described in greater detail with reference to FIG. 2, and continuing reference to FIG. 1. As illustrated as step 210 of FIG. 2, the system 1 first receives the customer call via the telephone 90. Having received the customer call, the system then requests a claim of identity from the customer. Such a claim of identity typically includes a request for the customer account number. This request can be made automatically by the system 1 and may require only that the customer input the account number via a touch tone telephone pad or spoken input. Thus, no human intervention is necessary.

Once the system 1 requests the claim of identity, as shown as step 220, the system 1 proceeds to retrieve and access the record in the customer database 62 identified by the received account number. As noted above, in the present embodiment the customer database 62 includes a field of information relating to the text string comprising the maiden name of the customer's mother. It is to be understood, however, that the secret password may include any predetermined information, including generally known information like the customer's address, as selected by the service provider. The CPU 40 reads the mother's maiden name. The actual name stored in the customer database 62 will have been entered by a bank employee via the keyboard 30 and stored in the database 62 prior to receiving the customer call in step 110. Retrieving and accessing the customer database 62, illustrated as step 230.

Once the system 1 accesses the customer database 62 in step 230, the system generates a subword spelling of the stored maiden name. In step 240, the generate subword spelling program 52 causes the CPU 40 to access the subword model database 64. Having read the maiden name from the customer database 62 in step 230, the CPU 40 proceeds to construct a subword model comprising a series of phonemes.

In one embodiment, the system 1 generates the subword spelling of the stored maiden name prior to receiving the customer call identified in step 210. The subword spelling is generated upon creation of the customer database 62 and stored as part of the database 62. In this manner, the speed of the system 1 upon receiving the customer call is enhanced.

Looking next to step 250, the system 1 proceeds to request and receive a speech utterance. The particular speech utterance requested depends upon the type of information stored in the customer database 62. In the present embodiment, the system 1 requests the customer to utter their mother's maiden name.

Once the system 1 receives the speech utterance, as shown as step 250, the system 1 proceeds to generate a free-phone model of that speech utterance. Generating the free-phone model, step 260, is performed by the CPU 40 as controlled by the generate free-phone model program 58. Other than the number of phonemes in the model (as discussed below), the free-phone model is generated independently of the information stored in the customer database 62. In other words, the system 1 dynamically creates the free-phone model based solely on the speech utterance.

In general, transforming the speech utterance into the free-phone model involves creating a string of phonemes comprising the same number of phonemes as the subword model based upon the text string. When the speech utterance is received, it is broken down into observation vectors. Each observation vector represents a discrete unit of time. The CPU 40, by accessing the subword model database 64, compares the frequency information received in each observation vector to known statistical models of the frequency information representing individual phonemes.

Due to individualistic speech patterns and pronunciations, which result in the blending of phonemes, the creation of the free-phone model is inexact. In other words, the generation of the free-phone model is probabilistic in nature, and there exists a likelihood that the free-phone model exactly represents the actual speech utterance. The statistical nature and creation of free-phone models are discussed in greater detail in "A Customer-Configurable System For Voice Label Recognition," by R. C. Rose, E. Lleida, G. W. Erhart, and R. V. Grubbe, herein incorporated by reference. Consequently, the CPU 40 must determine which statistical model most closely matches the received information for a given observation vector.

This comparison is repeated for each observation vector received. The CPU 40 creates the free-phone model by stringing together each of the phonemes that correspond to a matching statistical model. It should be noted, however, that in the present embodiment the free-phone model is restricted in length to the number of phonemes that comprise the text string of the maiden name. Consequently, the free-phone model is the optimal phoneme string of length N, where N is the length of phonemes in the subword spelling of the text string.

As indicated as step 160, the system 1 obtains a free-phone score based on the likelihood that the free-phone model exactly represents the actual speech utterance. More specifically, the free-phone score represents the overall difference between the information received as the utterance and the information contained in the statistical phoneme models matched to the utterance. Thus, the lower the free-phone score, the more likely the free-phone model accurately represents the speech utterance.

With a subword spelling of the stored maiden name, the system 1 proceeds to calculate a word score in step 280. The word score, also referred to as a forced-lexicon score, represents the likelihood that the subword spelling of the text string matches the received speech utterance. More specifically, in the present embodiment, the word score represents the sum of the difference between the information contained in each observation vector of the speech utterance and the information of the corresponding statistical phoneme model that comprises the subword spelling of the text string. Thus, the lower the word score, the smaller the difference between the received information and the statistical information, and the greater the likelihood that the speech utterance matches the text string.

Having thus calculated both a free-phone score and a word score, the system 1, in step 290, determines whether the speech utterance sufficiently matches the stored maiden name to allow the customer access to the information stored in the customer database 62. Specifically, the discrimination algorithm program 56 causes the CPU 40 to determine whether, based upon both the free-phone score and the word score, the received speech utterance matches the stored text string of the maiden name of the customer's mother.

Figure 3:
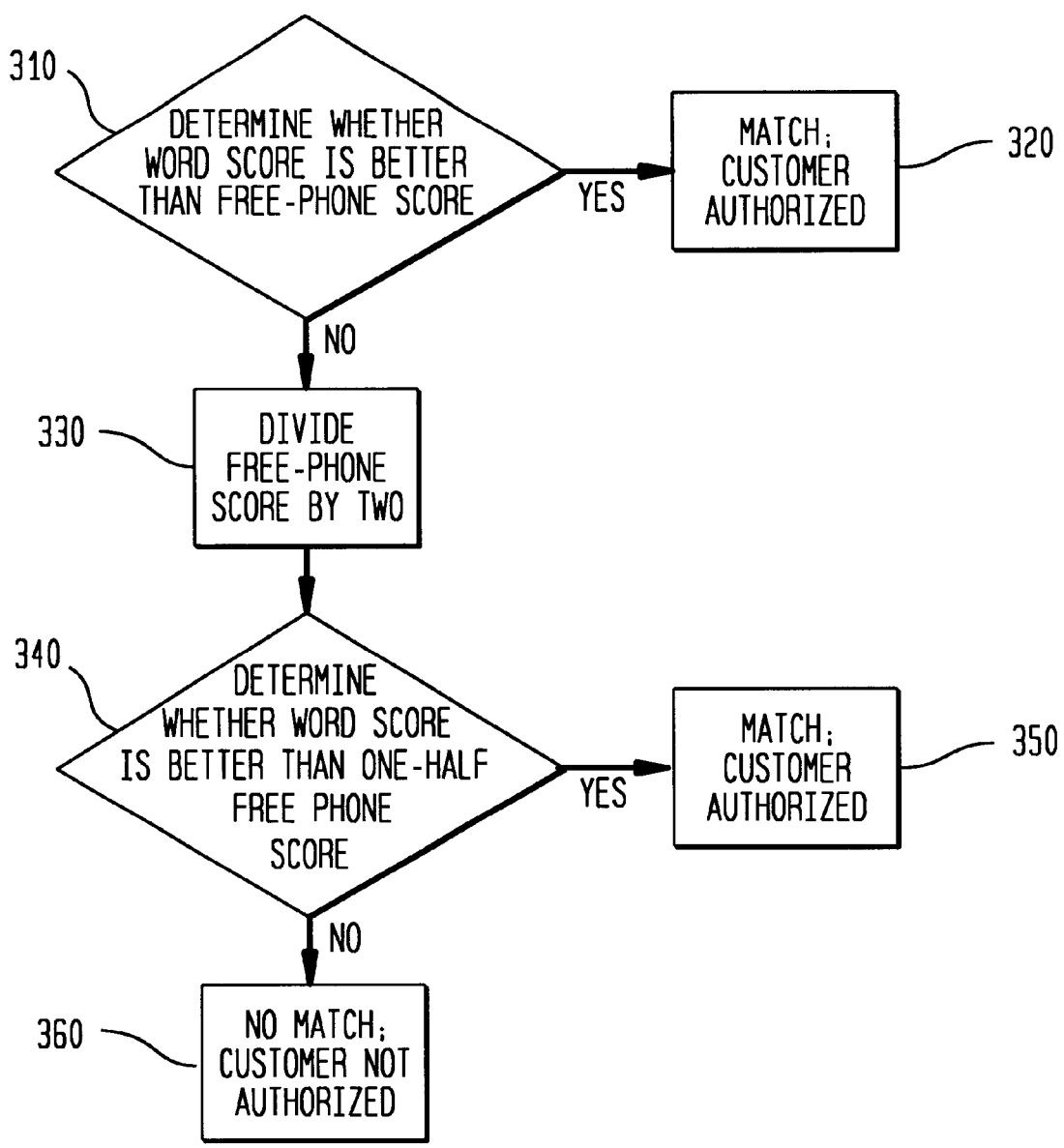
FIG. 3 is a detailed flow diagram of one embodiment of step 290 of FIG. 2.

Step 290 of FIG. 2 will now be described in greater detail with reference to FIG. 3, and continuing reference to FIG. 2. As an initial step in determining whether there is a match between the received utterance and the stored text string. The CPU 40 compares the word score to the free-phone score in step 310. If the word score is better than the free-phone score, then in step 320, the CPU 40 determines that the received utterance matches the stored text string. Thus, the customer is authorized to received information concerning the account.

On the other hand, if the word score is not better than the free-phone score, then in step 314, the CPU 40 divides the free-phone score by two. The CPU 40 proceeds in step 316 to determine whether the word score is better than half of the free-phone score. As indicated in step 318, if the word score is better than half the free-phone score divided by two, then the CPU 40 recognizes the received utterance as matching the stored text string. Thus the system 1 provides the customer with access to the information stored in the particular record in the customer database 62.

If the word score is not better than one-half of the free-phone score, then in step 320, the system 1 determines that no match exists and that the customer is not authorized. Where no match exists, the system 1 preferably repeats the operation from step 250 for a second time, so as to remedy an erroneous denial of access due to an unclear utterance. Experiments have shown that the operation of the system 1 according to FIGS. 2 and 3 results in approximately a 95% correct acceptance rate and a 0% incorrect acceptance rate.

It is to be understood that alternate embodiments in which the word score is compared to some fraction, other than one-half, of the free-phone score are within the scope of the present invention. Additionally, in an alternate embodiment, the determination of whether there is a match between the utterance and text string involves only the comparison of step 310 of FIG. 3.

In an alternate embodiment, the discrimination algorithm program 56 generates a confidence score that represents the absolute value of the difference between the free-phone score and the word score. In such an embodiment, the lower the confidence score, the greater the likelihood that the speech utterance matches the text string. In another alternate embodiment, the confidence recognition score represents a weighted average of the word score and free-phone score. The CPU 40 then compares this confidence recognition score to a predetermined threshold confidence recognition value. If the confidence score is less than the threshold value, then the system 1 determines that a match between the speech utterance and the stored maiden name. Consequently, access to the account information is allowed.

On the other hand, if the CPU 40 determines that the confidence recognition score is greater than the threshold value, then the system 1 finds no match. Denies the customer access to the account information.

In an alternative embodiment, the system generates only a free-phone model and free-phone score. In one such embodiment, the system determines whether the received utterance matches the stored unit of speech by comparing the free-phone score to a threshold value.

Although the present invention has been described in terms of certain preferred embodiment, it is to be understood that other embodiments are equally within the scope of the invention. Accordingly, the scope of the present invention is intended to be limited only by the claims appended hereto.

What is claimed is:

1. A method for recognizing a speech utterance as a predetermined unit of speech, the method comprising:

requesting and receiving a claim of identity;

accessing a customer database in response to receiving said claim of identity;

wherein a predetermined unit of speech is stored in said customer database;

generating a subword spelling of said predetermined unit of speech;

accessing a subword model database that stores a plurality of phonemes, each phoneme representing a sound, to construct a subword model comprising a series of phonemes;

requesting and receiving a speech utterance;

generating a free-phone model of the speech utterance without accessing said customer database;

calculating a free-phone score, said free-phone score representing a likelihood that said free-phone model accurately represents the speech utterance;

calculating a word score, said word score representing a likelihood said subword spelling accurately represents said speech utterance;

determining, based upon said free-phone score and said word score, whether the speech utterance matches the predetermined unit of speech by:

calculating a confidence score based upon said word score and said free-phone score by (i) comparing said word score to said free-phone score, and (ii) if said word score is not better than said free-phone score, comparing said word score to a fraction of said free-phone score.

2. The method of claim 1, further comprising the step of:

comparing said confidence score to a threshold confidence score.

3. The method of claim 2 wherein said step of calculating a confidence score includes calculating a weighted average of said word score and said free-phone score.

4. The method of claim 2 wherein said step of determining includes determining a difference between said word score and said free-phone score.

5. An article of manufacture comprising:

a computer readable medium having computer readable program code means embodied thereon, said computer readable program code means comprising means for generating a free-phone score based upon an utterance, and means for determining, based upon said free-phone score, whether said utterance matches a unit of speech;

wherein said computer readable program code means further includes means for generating a word score based upon said unit of speech and wherein said means for determining determines whether said utterance matches said unit of speech based upon said free-phone score and said word score.

6. A device comprising:

a memory device having a representation of a unit of speech stored therein;

a processor coupled to said memory device, said processor configured to generate a free-phone score based upon a speech utterance and further configured to determine whether said speech utterance is said unit of speech based upon said free-phone score;

an input device for receiving said speech utterance, said input device coupled to said processor;

wherein said processor further generates a word score based upon said unit of speech and determines whether said speech utterance is said unit of speech based upon said free-phone score and said word score;

wherein said processor is configured to compare said word score to said free-phone score, and determine whether said word score is better than said free-phone score;

wherein said processor is further configured to compare said word score to a fraction of said free-phone score.

7. The device of claim 6 wherein said processor is further configured to compare said word score to a fraction of said free-phone score.

8. The device of claim 7 wherein said fraction is one-half.

9. The device of claim 6 wherein said representation of said unit of speech is a subword spelling of said unit of speech.

10. A speech recognition system for recognizing a speech utterance as a predetermined unit of speech, the system comprising:

means for requesting and receiving a claim of identity;

means for accessing a customer database in response to receiving said claim of identity;

wherein a predetermined unit of speech is stored in said customer database;

means for generating a subword spelling of said predetermined unit of speech;

means for accessing a subword model database that stores a plurality of phonemes, each phoneme representing a sound, to construct a subword model comprising a series of phonemes;

means for requesting and receiving a speech utterance;

means for generating a free-phone model of said speech utterance without accessing said customer database;

means for calculating a free-phone score, said free-phone score representing a likelihood that said free-phone model accurately represents said speech utterance;

means for calculating a word score, said word score representing a likelihood said subword spelling accurately represents said speech utterance;

means for determining, based upon said free-phone score and said word score, whether said speech utterance matches said predetermined unit of speech by:

calculating a confidence score based upon said word score and said free-phone score by (i) comparing said word score to said free-phone score, and (ii) if said word score is not better than said free-phone score, comparing said word score to a fraction of said free-phone score.

* * * * *